(12) United States Patent
Beck

(10) Patent No.: US 7,509,835 B2
(45) Date of Patent: Mar. 31, 2009

(54) HELMET WITH SHOCK DETECTOR, HELMET ATTACHMENT DEVICE WITH SHOCK DETECTOR AND METHODS

(76) Inventor: Gregory S. Beck, 2580 Lemmon Ct., Hanford, CA (US) 93230

( * ) Notice: Subject to any disclaimer, the term of this patent is extended or adjusted under 35 U.S.C. 154(b) by 54 days.

(21) Appl. No.: 11/450,957

(22) Filed: Jun. 9, 2006

(65) Prior Publication Data

US 2007/0089480 A1 Apr. 26, 2007

Related U.S. Application Data

(63) Continuation-in-part of application No. PCT/US2004/041798, filed on Dec. 9, 2004.

(60) Provisional application No. 60/529,453, filed on Dec. 12, 2003.

(51) Int. Cl.
*G01N 3/30* (2006.01)
(52) U.S. Cl. ................... 73/12.01; 73/12.04; 2/425
(58) Field of Classification Search .............. 73/12.01, 73/12.04, 12.09; 2/414, 425
See application file for complete search history.

(56) References Cited

U.S. PATENT DOCUMENTS

| | | | | | |
|---|---|---|---|---|---|
| 3,623,449 | A | * | 11/1971 | Knutson | 116/203 |
| 3,835,809 | A | | 9/1974 | Sinn, Jr. | |
| 4,068,613 | A | * | 1/1978 | Rubey | 116/203 |
| 4,125,085 | A | * | 11/1978 | Rubey | 116/203 |
| 4,177,751 | A | * | 12/1979 | Rubey | 116/201 |
| 4,219,708 | A | * | 8/1980 | Rubey | 200/61.47 |
| 4,233,689 | A | | 11/1980 | Baron | |
| 4,239,014 | A | * | 12/1980 | Rubey | 116/203 |
| 4,470,302 | A | | 9/1984 | Carte | |
| 4,663,785 | A | | 5/1987 | Comparetto | |
| 4,763,275 | A | * | 8/1988 | Carlin | 702/41 |
| 5,345,614 | A | | 9/1994 | Tanaka | |
| 5,546,609 | A | | 8/1996 | Rush, III | |
| 5,551,279 | A | | 9/1996 | Quick | |
| 5,621,922 | A | * | 4/1997 | Rush, III | 2/422 |
| 6,301,718 | B1 | * | 10/2001 | Rigal | 2/411 |
| 6,332,226 | B1 | | 12/2001 | Rush, III | |
| 6,516,662 | B2 | * | 2/2003 | Steinhart et al. | 73/149 |
| 6,798,392 | B2 | * | 9/2004 | Hartwell et al. | 345/8 |
| 2002/0060633 | A1 | | 5/2002 | Crisco, III et al. | |
| 2005/0076987 | A1 | * | 4/2005 | O'Brien et al. | 152/415 |
| 2006/0038694 | A1 | * | 2/2006 | Naunheim et al. | 340/665 |
| 2006/0277664 | A1 | * | 12/2006 | Akhtar et al. | 2/410 |
| 2007/0056081 | A1 | * | 3/2007 | Aspray | 2/411 |

FOREIGN PATENT DOCUMENTS

FR 2566632 1/1986

* cited by examiner

*Primary Examiner*—Harshad Patel
*Assistant Examiner*—Freddie Kirkland, III
(74) *Attorney, Agent, or Firm*—John J. Connors; Connors & Assoc. Inc.

(57) ABSTRACT

A helmet includes a head enclosure with an open cavity for the head of a user and a shock detector attached to the head enclosure that provides a signal when the head enclosure is subjected an impact exceeding a predetermined level.

18 Claims, 13 Drawing Sheets

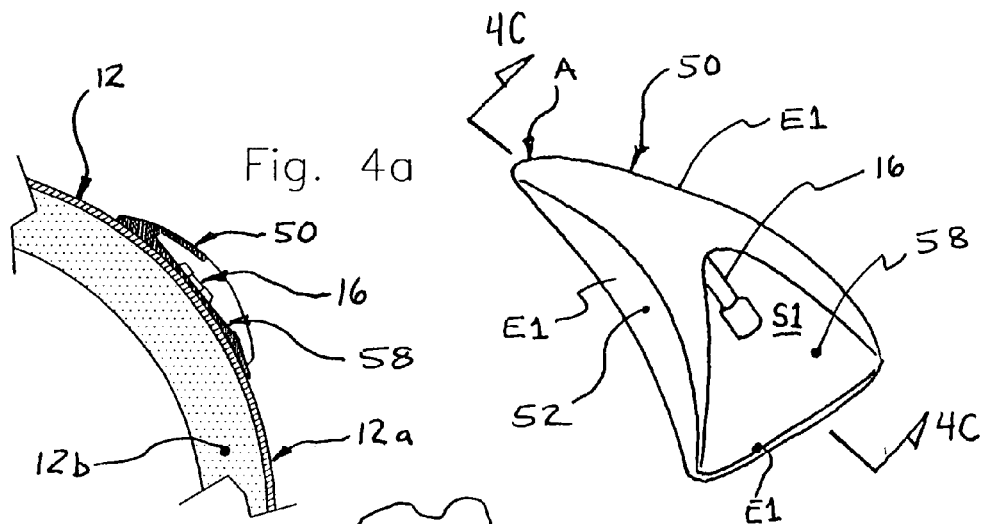
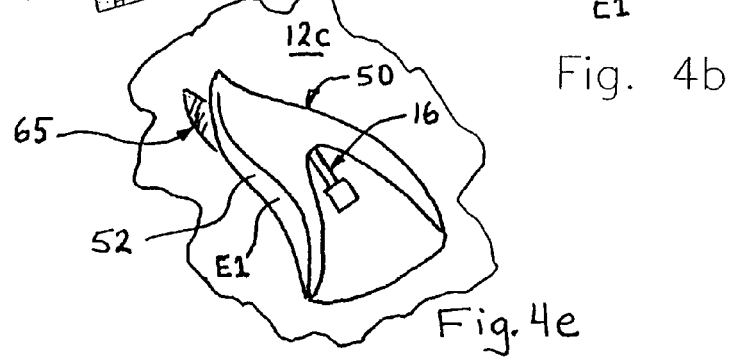
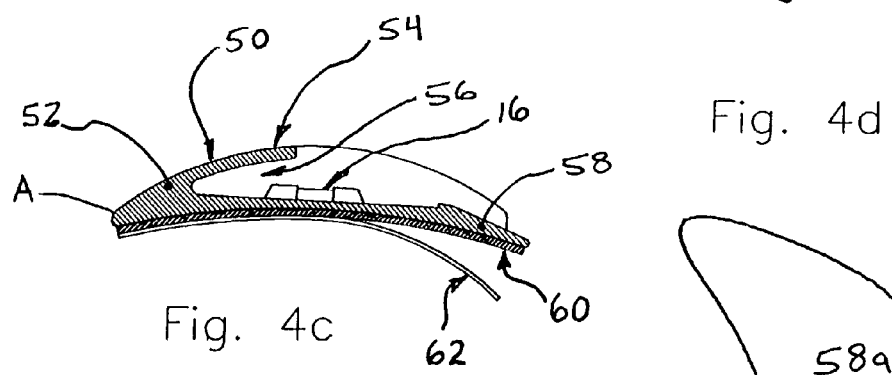
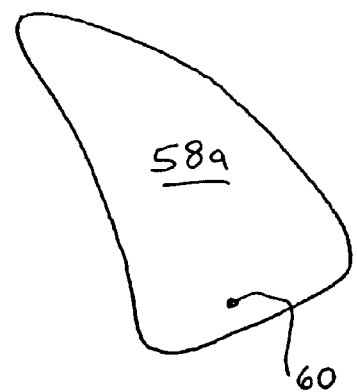

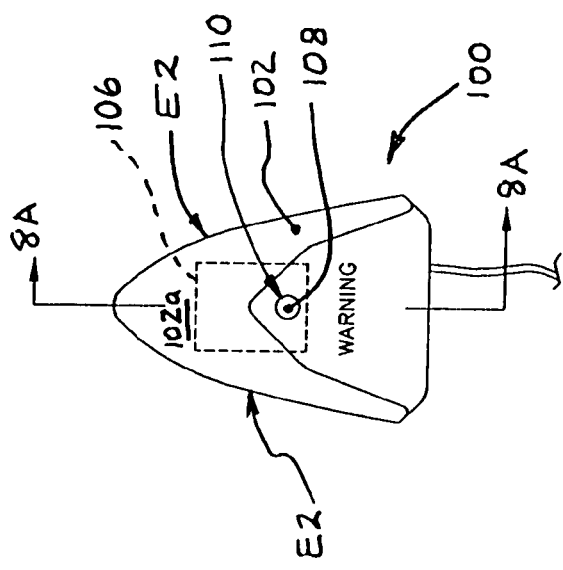
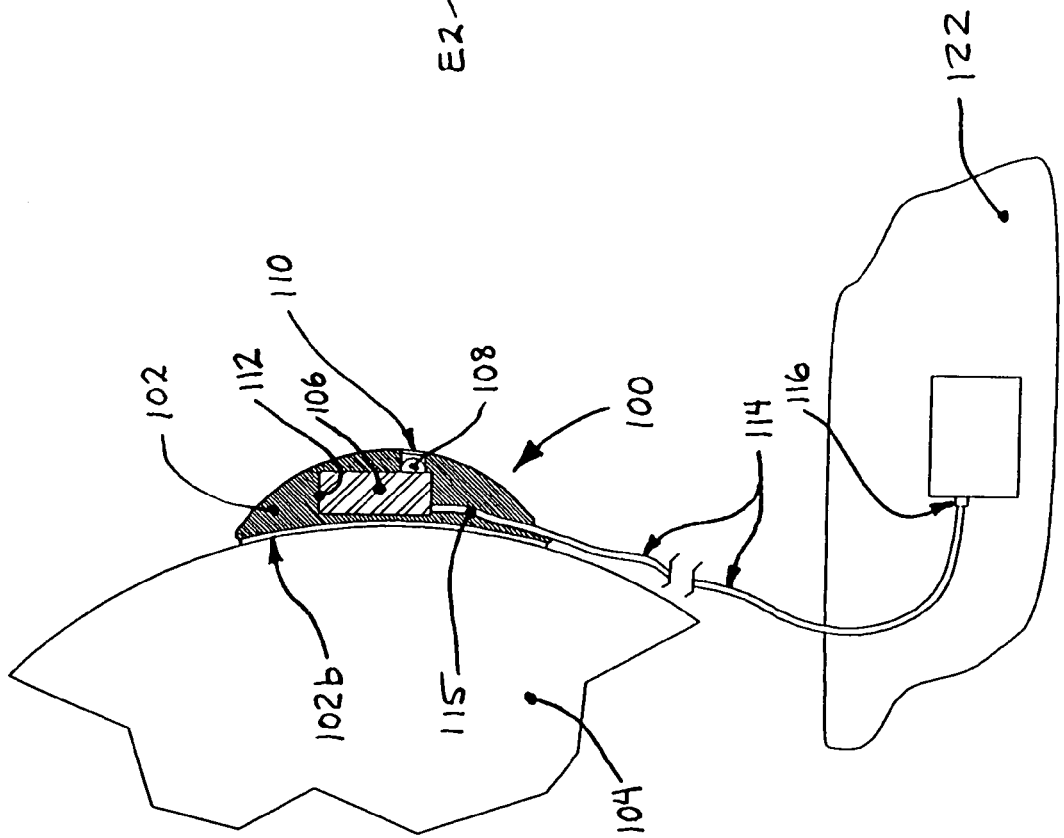
Fig. 8
Fig. 8a

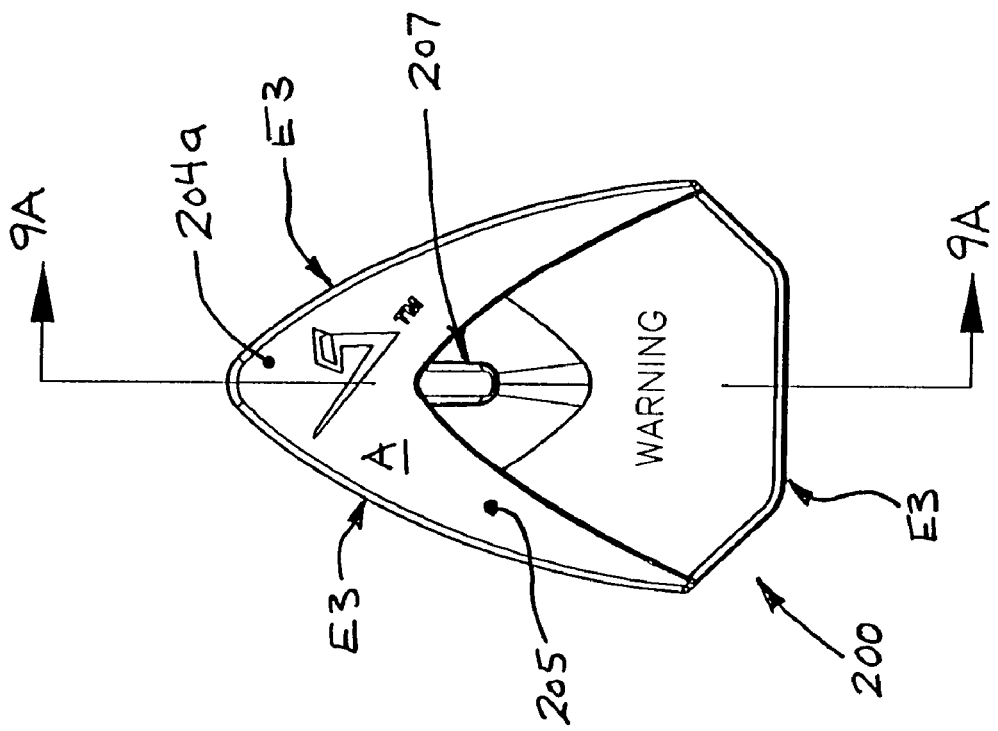
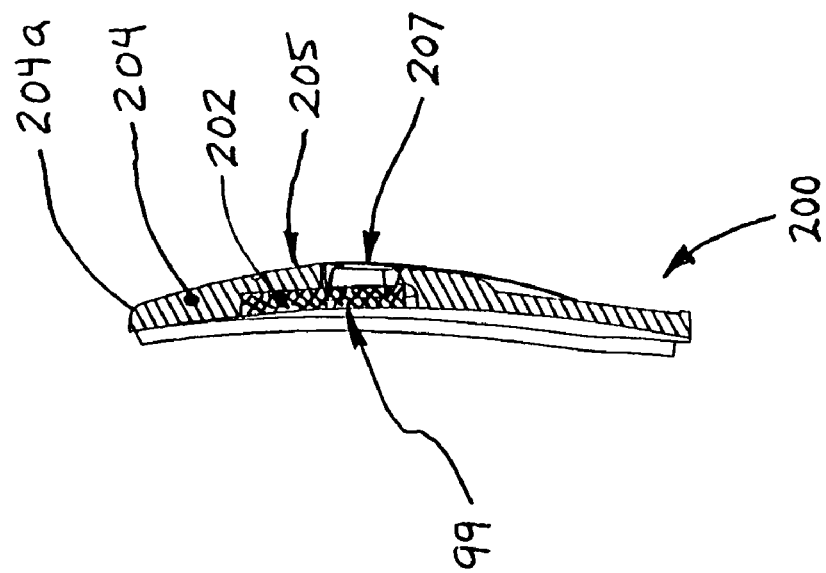
Fig. 9
Fig. 9a

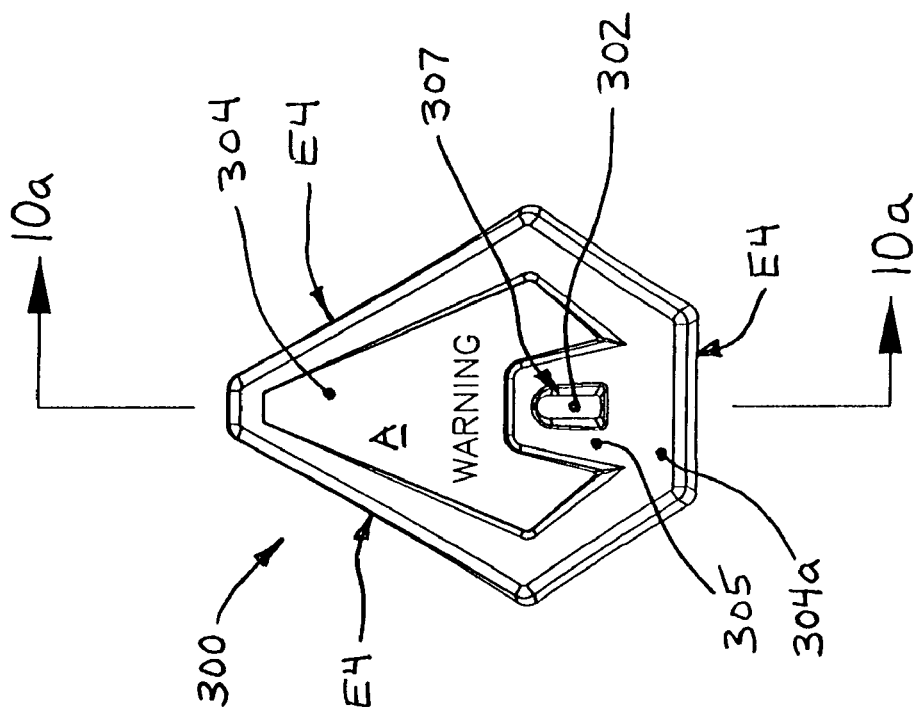
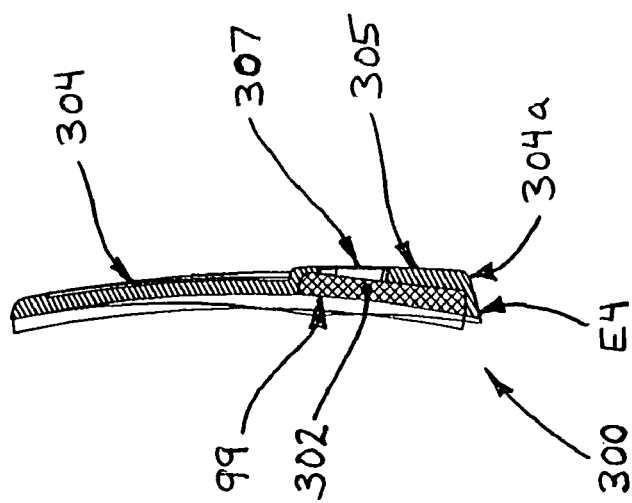

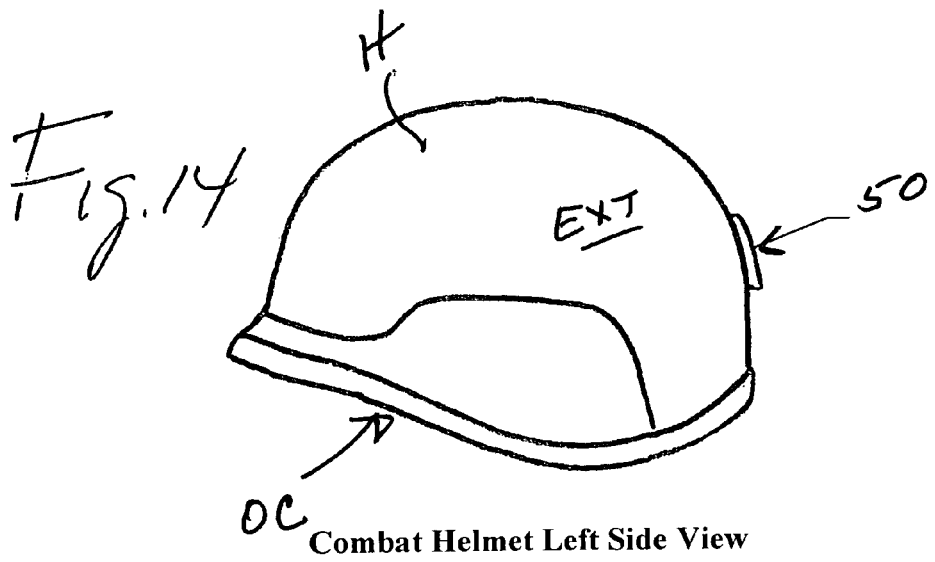
Combat Helmet Left Side View
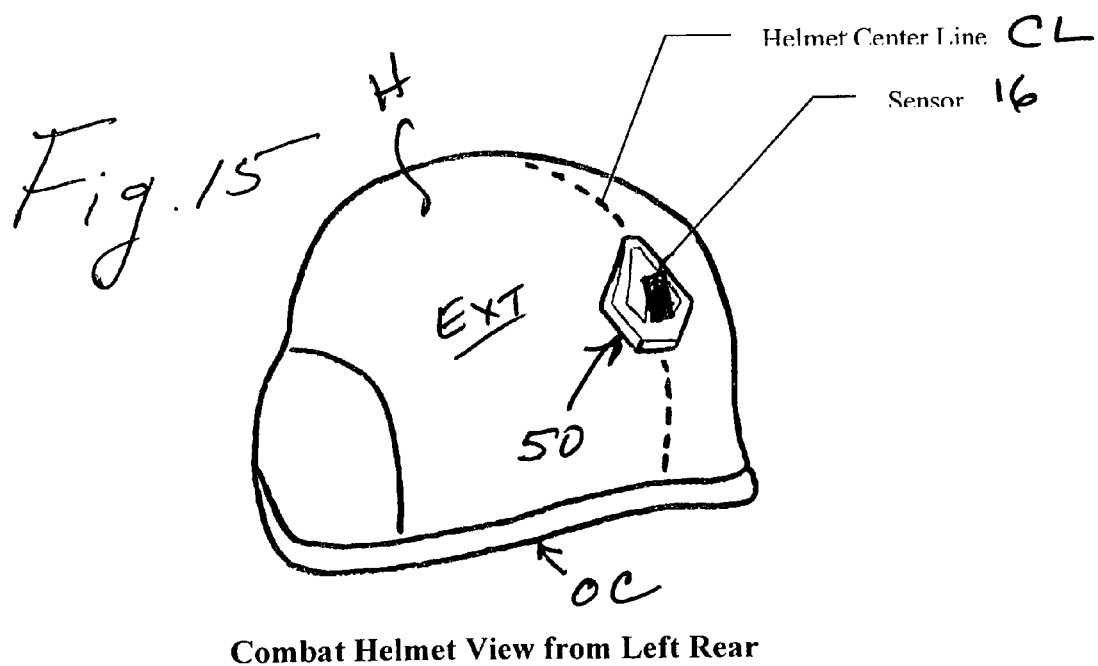
Combat Helmet View from Left Rear

HELMET WITH SHOCK DETECTOR, HELMET ATTACHMENT DEVICE WITH SHOCK DETECTOR AND METHODS

RELATED PATENT APPLICATIONS & INCORPORATION BY REFERENCE

This utility application is a continuation-in-part application of the national stage of International Application No. PCT/US2004/041798, filed Dec. 9, 2004, which claims the benefit under 35 USC 119(e) of U.S. Provisional Application Ser. No. 60/529,453, entitled "Safety Helmet With Shock Detector & Helmet Attachment Device With Shock Detector," filed Dec. 12, 2003. These related applications, and patents and other documents, hard copy or electronic, cited or referred to in this utility application are incorporated herein by reference and made a part hereof.

DEFINITIONS

The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

BACKGROUND OF INVENTION

Safety helmets are widely used by motorcyclists, auto racers, bike riders, athletes, and others who need to wear protective headgear. These helmets typically comprise a tough outer shell and an internal shock absorbing liner such as, for example, a foam plastic. The outer shell is substantially rigid, but when subjected to the high impact experienced in a collision, buckles momentarily, sometimes compressing the foam plastic that absorbs the energy of the collision. Once compressed the foam plastic liner remains compacted, and thereafter is not as capable of absorbing the energy of another collision. The outer shell usually has sufficient flexibility to return to its normal condition and the damage to the shock absorbing liner is visually undetectable. In other words, one impact may render the helmet incapable of thereafter adequately protecting the user, but the degradation of the shock absorbing character of the liner is unnoticed. Although one high-energy impact may render the helmet incapable of adequately protecting the user, several repeated low energy impacts may also render the helmet incapable of adequately protecting the user. Manufactures of various types of helmets fail to recognize that such repeated low energy impacts degrade the ability of the helmet to protect the user. Consequently, there is a risk of an athlete in a contact sport such as, for example, lacrosse, hockey, football, skiing, snow boarding, etc., sustaining a serious head injury because the helmet has lost its ability to absorb the energy of even a low level impact due to sustaining a number of low level impacts. Moreover, soldiers and other military personnel, frequently experience brain injuries from bomb blasts even when wearing a helmet, but are unaware of such injury.

SUMMARY OF INVENTION

This invention has one or more features as discussed subsequently herein. After reading the following section entitled "DETAILED DESCRIPTION OF SOME EMBODIMENTS OF THIS INVENTION," one will understand how the features of this invention provide its benefits. These benefits include, but are not limited to: (a) detection of a potentially damaging impact to a helmet not otherwise visually detectable, (b) detection of head injuries experienced by athletes, military personnel, an other wearing a helmet, and (c) a low cost, convenient to mount attachment device adapted to be connected to a conventional helmet not having a shock detector.

Without limiting the scope of this invention as expressed by the claims that follow, some, but not necessarily all, of its features are:

One, the helmet of this invention includes a head enclosure with an open cavity for the head of a user and a shock detector attached to the head enclosure. The helmet may or may include internal impact absorbing liner, and my be of the type worn by athletes, military personnel or other that are likely to sustain a head injury.

Two, the head enclosure may comprise a tough, substantially rigid yet flexible shell and an internal impact absorbing liner suited to absorb an impact exceeding a predetermined level. The liner may be a foam material that is compressed to absorb the impact. The shock detector may be attached to an exterior surface of the head enclosure and it provides a signal when the head enclosure is subjected an impact exceeding a predetermined level. The signal may be visual or audible. This shock detector may be incorporated into the helmet during its manufacture, or it may be a component of an attachment device that is attached (typically by the user) to the helmet after the helmet has been manufactured. The shock detector may be received within a recess, and one or a plurality of shock detectors may be located in different positions on the helmet. A wall structure may at least partially encloses the shock detector. The shock detector may provide the signal upon detecting a single, high g force impact, or it may provide the signal after sustaining a number of low level impacts.

Three, the shock detector may be calibrated to provide a signal for a predetermined impact level corresponding to the use of helmet. The shock detector typically is an accelerometer that is calibrated to provide the signal when subjected, nominally, to an acceleration of from about 50 to about 200 g's for 50 milliseconds, or, nominally, to an acceleration of from about 150 to about 500 g's for 2 milliseconds. One way to test the calibration of an individual helmet is to drop it from a predetermined elevation above ground. Upon impact of the helmet with the ground, the shock detector is activated to provide the signal, but the detector does not provide this signal when dropped to ground at a lower elevation. Different types of helmets may be dropped at different elevations commensurate with their respective use. In other words, some helmets must sustain greater impacts than others without activating the signal. For military applications, calibration may entail using a dummy wearing the helmet with the shock detector and setting off an explosion using a predetermined type of explosive at a predetermined distance from the dummy.

Four, the shock detector may be mechanical or electronic. In one embodiment, the mechanical shock detector may include a liquid droplet within a light permeable container. The droplet, when subjected to an acceleration below a predetermined level, remains in tact and, when subjected to an acceleration above the predetermined level, at least a portion of the droplet is disbursed to provide the visual signal. In another embodiment, the electronic accelerometer includes a light source that is energized electrically to provide the visual signal. The electronic shock detector may include an outwardly extending, conductive cord having an external terminal end adapted to be detachably connected to a power source and control circuit for the electronic accelerometer. The electronic shock detector instead of providing a light signal may provide an audio signal or store the information about the impact such as the g force experienced and time duration of the g force or transmit this information to a remote receiving station. This may be very desirable in connection with military personnel wearing a helmet with an electronic shock detector.

Five, this invention also encompasses an attachment device adapted to be mounted to a helmet. The device may include a mounting member holding a shock detector, either mechanical or electronic, or otherwise. Upon attaching this member to the helmet, a signal is provided when the helmet is subjected to an impact exceeding a predetermined level. The mounting member may have a recess including a surface to which the shock detector is attached and an external portion including an adhesive capable of holding the mounting member on the helmet. Typically, a removable member covers the adhesive. The mounting member may have (a) an aerodynamic shape including a tapered forward-looking element with beveled, inwardly sloped edges and a low profile, for example, a height of less than about ½ inch, (b) a wall structure forming at least in part the recess that partially encloses the shock detector, and/or (c) a warning that, when the signal appears, the helmet may no longer provides impact protection. The mounting member may be made of a flexible material and the external portion has a surface that may be shaped to correspond to a predetermined shape of an external surface of the helmet to which the attachment device is to be connected. Thus, upon connection to the helmet, the mounting member may be shaped, for example, substantially concave, to conform to and bear against the external surface of the helmet. Nevertheless, some helmets have substantially flat exterior surface segments, and in such a case, the external portion of the mounting member has a substantially flat surface.

In one embodiment of the attachment device of this invention, the mounting member may have first and second sides. The first side is exposed to view upon attaching the mounting member to the helmet to enable a visual signal to be observed and a second side with an opening providing access to a recess that enables the shock detector to be inserted into the recess from the second side. A wall element may be attached to the second side that covers the opening. This wall element may have an exterior surface with an adhesive thereon. The first and second sides may be opposite each other and the second side may be shaped so that it conforms in shaped to the exterior surface of the helmet to which the attachment device is mounted.

These features are not listed in any rank order nor is this list intended to be exhaustive.

This invention also includes a method of identifying a damaged helmet comprising the steps of (a) attaching a shock detector to the helmet that provides a signal when the helmet has been subjected to an impact exceeding a predetermined level, and (b) when the signal occurs, returning the helmet to its manufacturer for inspection to determine if the helmet is damaged and needs to be replaced.

Inspection may comprise sound testing of the helmet.

This invention also includes a method for monitoring for a possible head injury of an athlete participating in a sporting activity comprising the steps of (a) the athlete during the sporting activity wearing a helmet having a shock detector that provides a signal when the helmet is subjected an impact exceeding a predetermined level, and (b) terminating the athlete's participation in the sporting activity for a period of time to observe the athlete's physical condition when said signal is provided upon said helmet sustaining the impact exceeding the predetermined level.

Another method of this invention calls for monitoring for a possible head injury of military personnel in combat. This method comprises the steps of (a) said military personnel during combat wearing a helmet having a shock detector that provides a signal when the helmet is subjected an impact exceeding a predetermined level, and (b) terminating said military personnel's participation in combat for a period of time to observe said military personnel's physical condition when said signal is provided upon said helmet sustaining said impact exceeding the predetermined level.

An additional step call for recording in the medical record of military personnel experiencing a head impact while in military service. When a high level, dangerous impact has been experienced by military personnel wearing a helmet with either a mechanical or electronic shock detector, this is noted in the medical record of such personnel. This will avoid in many cases misdiagnosing subsequent medical problems. In other words, if this impact information is missing in the medical record, a doctor may attribute later medical problems incorrectly to other causes.

DESCRIPTION OF THE DRAWING

Some embodiments of this invention, illustrating all its features, will now be discussed in detail. These embodiments depict the novel and non-obvious safety helmet, attachment device, and methods of this invention as shown in the accompanying drawing, which is for illustrative purposes only. This drawing includes the following figures (Figs.), with like numerals indicating like parts:

FIG. 4A is a cross-sectional view taken along line 4A-4A of FIG. 4.

FIG. 4B is a perspective view of one embodiment of the attachment device of this invention holding a shock detector and adapted to be mounted to a conventional safety helmet.

FIG. 4C is a cross-sectional view taken along line 4C-4C of FIG. 4B.

FIG. 4D is a perspective view of the attachment device of this invention depicted in FIGS. 4B and 4C, showing the concave underside with a cover member removed to expose an adhesive coating covering the underside.

FIG. 4E is a perspective view of attachment device of this invention partially pulled away from the external surface of the helmet to which it is connected, showing a portion of external surface of the helmet damaged, indicating tampering.

FIG. 8 is a plan view of another embodiment of the attachment device of this invention employing an electronic accelerometer.

FIG. 8A is a cross-sectional view taken along line 8A-8A of FIG. 8.

FIG. 9 is a plan view of another embodiment of the attachment device of this invention.

FIG. 9A is a cross-sectional view taken along line 9A-9A of FIG. 9.

FIG. 10 is a plan view of still another embodiment of the attachment device of this invention.

FIG. 10A is a cross-sectional view taken along line 10A-10A of FIG. 10.

FIG. 14 is a side view of a combat helmet in accordance with one embodiment of this invention.

FIG. 15 is a rear view of a combat helmet shown in FIG. 14.

DETAILED DESCRIPTION OF SOME EMBODIMENTS OF THIS INVENTION

FIGS. 1 through 4

Figure 1:
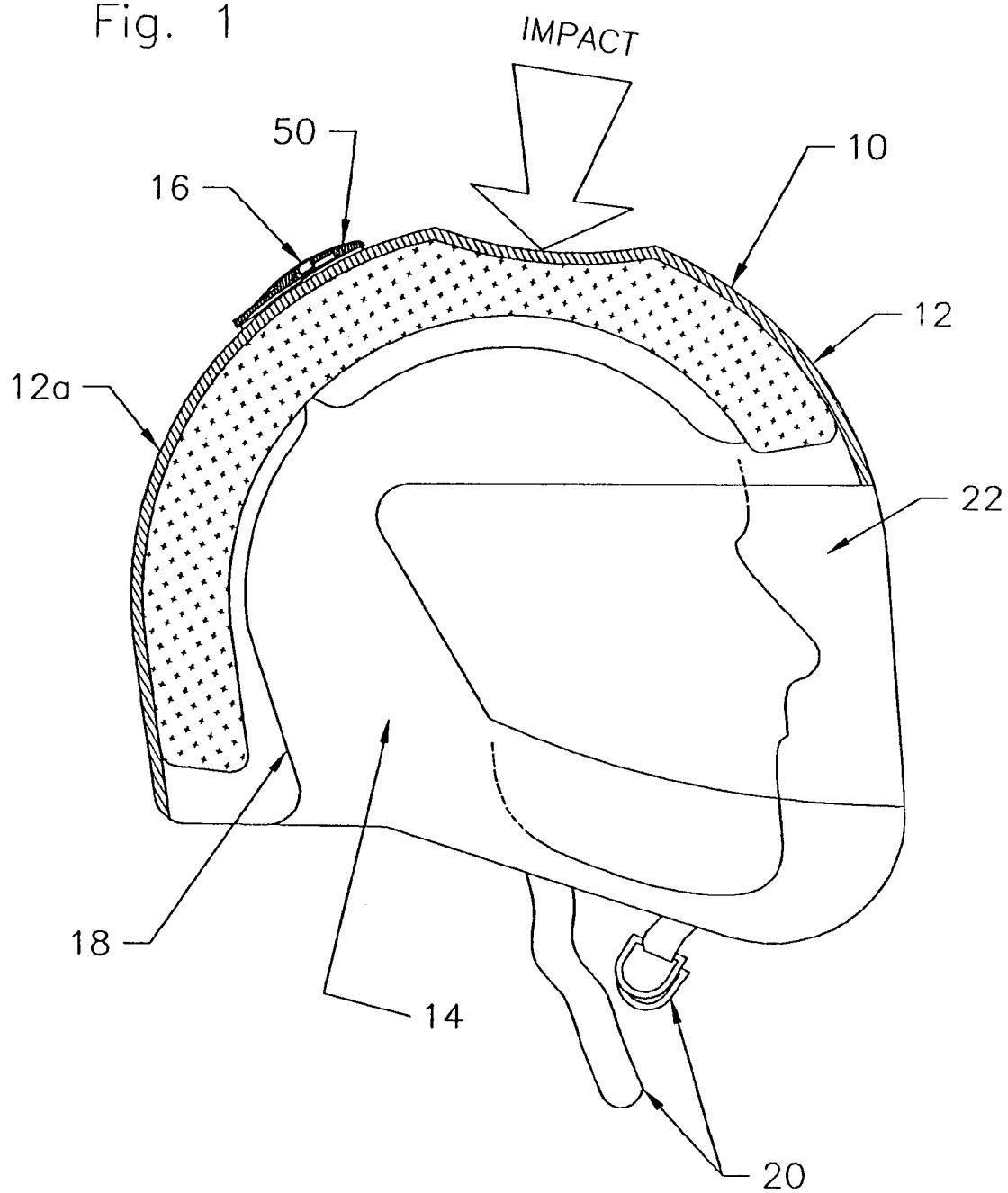
FIG. 1 is a side elevational view, partially in cross-section, of one embodiment of the safety helmet of this invention showing the helmet sustaining an impact.
Figure 4:
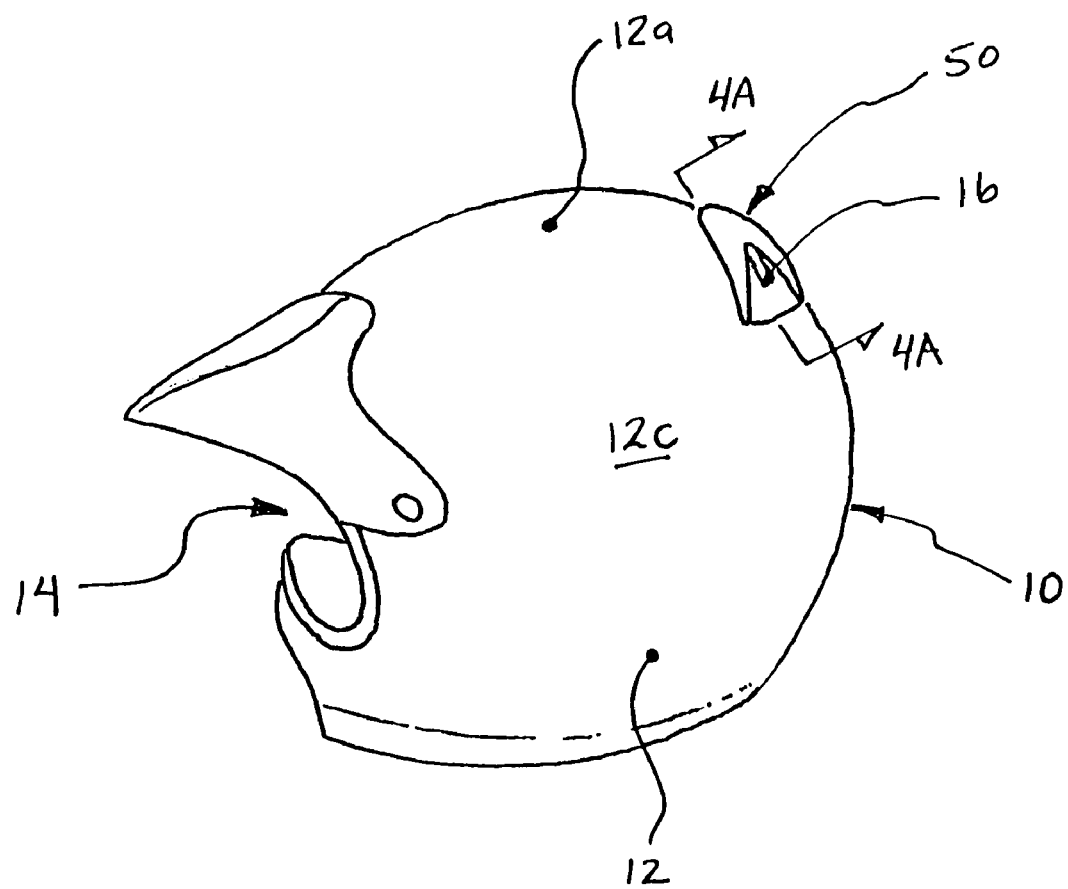
FIG. 4 is a rear perspective view of the safety helmet shown in FIG. 1.

As illustrated in FIGS. 1 and 4, one embodiment of the safety helmet 10 of this invention includes a head enclosure 12 with an open cavity 14 for the head of a user and a shock detector 16 attached to the head enclosure.

The head enclosure 12 comprises a tough, substantially rigid, yet flexible, shell 12a typically made of plastic such as, for example, polycarbonate or Kevlar®, and an internal impact absorbing liner 12b suited to absorb the energy of an impact. The liner 12b may be, for example, a plastic foam material of polystyrene. This liner 12b comprises a plurality of cells 13 (FIG. 2) that are compressed, and remain compressed, when the head enclosure 12 is subjected to an impact exceeding a predetermined level. The helmet 10 may also include padding 18 for improved comfort external to the inside surface of the liner 12b, a chin strap 20, and a face shield 22.

Figure 2:
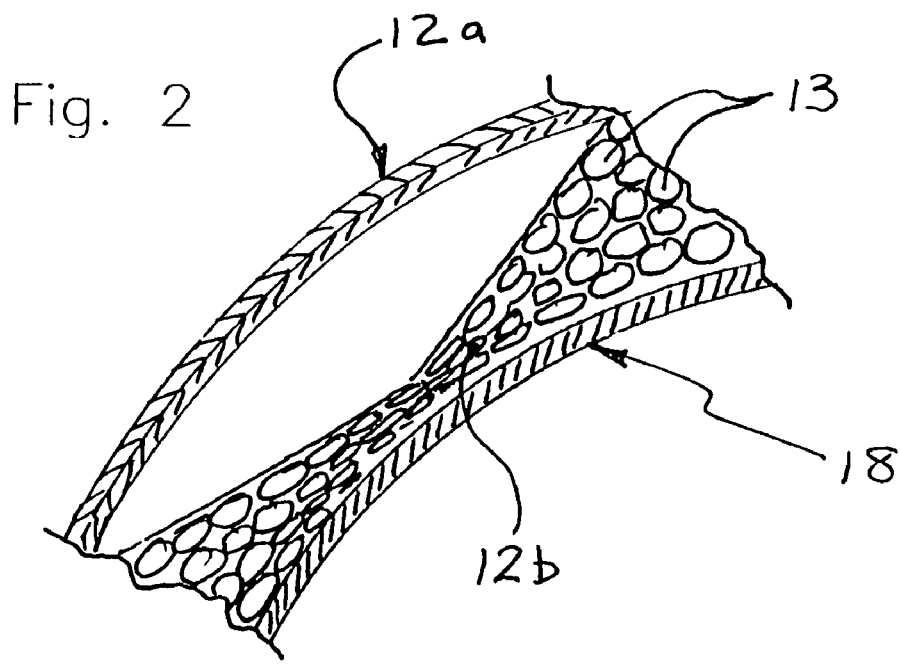
FIG. 2 is a fragmentary cross-sectional view of a portion of the helmet shown in FIG. 1 after sustaining the impact.

As depicted in FIG. 1, when the force of the impact depresses the shell 12a at the point of contact, the shell is pushed inward to deform and compact the liner 12b. As shown in FIG. 2, the shell 12a often returns to the condition it was in prior to impact. The liner 12b, however, remains deformed and compacted. The helmet 10 now is no longer able to absorb adequately the energy of an impact. The shock detector 16 provides a signal when it detects an impact exceeding a predetermined level. The signal may be generated when the head enclosure 10 is subjected a single high-energy impact or after being subjected to repeated low-energy impacts.

Acceleration (negative or positive acceleration) is a measure of an impact: the greater the absolute number (positive or negative), the greater the impact. In the embodiments disclosed, a shock detector 16 is employed that "goes off" when it detects an impact at predetermined level, for example, an acceleration exceeding about 100 g's (g=32 feet per second per second). The predetermined level at which the shock detector "goes off" may vary depending on the design of the helmet and use. If the helmet 10 is dropped accidentally, the liner 12b may not be irreversibly compacted. Consequently, it is desirable to employ a shock detector 16 that does not "go off" with only a single low-energy impact. Nevertheless, with repeated low-level impacts producing a degradation of the helmet's ability to absorb adequately the energy of impacts, even low-energy impacts, the shock detector 16 does "go off" after a predetermined number (more than one) of low-energy impacts are sustained.

Various types of shock detectors may be employed in this invention. For example, a shock detector may be either a mechanical or an electronic accelerometer. A shock detector that provides a visual signal has the advantage of convenience, since once the helmet 10 sustains a potentially damaging single high-energy impact or repeated low-energy impacts, the user is notified that the helmet possibly no longer affords the user impact protection. One suitable mechanical shock detector employing liquid surface tension technology is disclosed in U.S. Pat. Nos. 4,068,613; 4,125,085; 4,177,751; 4,219,708; and 4,239,014. The mechanical shock detector 16 is of the type disclosed in these patents and is sold by Detectors, Inc., of Graham, Tex. under the trademark Shockwatch®. One suitable electronic shock detector is sold by Silicon Designs, Inc. of Issaquah, Wash. Model 1010. This electronic shock detector includes a capacitor that detects acceleration and a conductive cord connecting the capacitor to a control circuit including a microprocessor and power supply. This type of electronic accelerometer is used in connection with the embodiment of this invention discussed subsequently in connection with FIGS. 8 and 8A.

Figure 3:
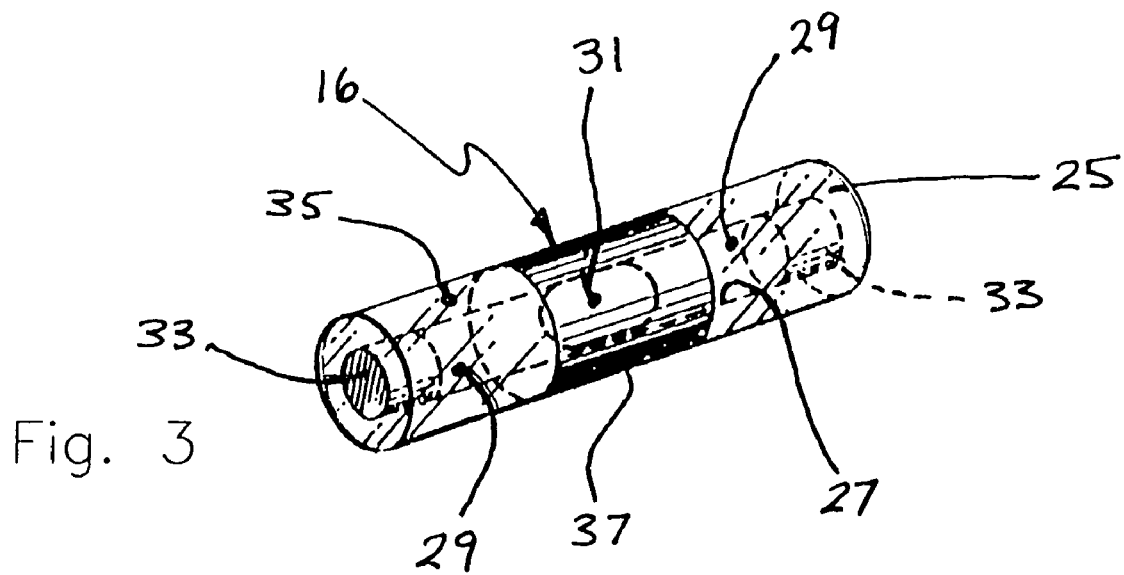
FIG. 3 is a perspective view of one type of shock detector used with the safety helmet of this invention.

As depicted in FIG. 3, a suitable mechanical shock detector 16 includes a hollow tube 25 having a bore 27 extending along the tube's longitudinal axis. At least two materials 29 and 31 are disposed in the bore 27. The ends of the bore are closed by seals 33. There is a transparent or translucent light permeable section 35 in at least one end of the tube 25. This tube 25 has a relatively small internal diameter such that the bore 27 may readily hold a droplet of liquid (material 31). If the entire tube 25 is transparent, an opaque band 37 may be employed to conceal the material 31 until an interfacial boundary or barrier between the materials 29 and 31 has been ruptured by an impact exceeding, for example, 100 g's. The two materials 29 and 31 may be, respectively, a gas and a liquid and are chosen such that the droplet of the liquid forming the material 31 is held near the center of the tube 25 by discrete slugs of gas (material 29) filling the ends of the tube 25.

The liquid droplet 31 extends across and completely blocks the bore 27 near the bore's mid-point and the discrete slugs of the gas, such as air (material 29), are at each end of the bore and each air slug interfaces with the liquid droplet (material 31). The interfacial barriers between the liquid (material 31) and gas (material 29) will rupture if the predetermined impact is received by the helmet 10. The seals 33 insure that the air and liquid remain trapped with in the bore 27. Typically, the droplet of the liquid forming the material 31 is an aqueous solution of an anti-freeze, such as ethylene glycol, and a water soluble dye, such as red dye. This red droplet material 31 is held in place by the slugs of air, forming air caps 29, at each end of the bore 27. The tube's 25 internal surface is hydrophobic such that the aqueous liquid droplet material 31 does not wet this internal surface.

In operation, liquid droplet material 31 is held together by surface tension, or "skin effect", and held in position blocking the bore 27 by the slugs of air (the material 29). The liquid is of a contrasting color, such as red. It is not normally visible because of the opaque band 37. When impacted by a force of sufficient magnitude (sufficient positive or negative acceleration) to break the liquid surface tension creating the interfacial barrier between the respective liquid droplet material 31 and the slugs of air (the material 29), the liquid will flow into one or both ends of the tube 25, being disbursed to provide a visual signal. If visible, the user of the helmet 10 is warned that a potentially damaging impact has been sustained by the helmet. Because the shock detector 16 is attached to an exterior surface of the head enclosure 12, the user can immediately see that the helmet 10 may be permanently damaged.

Figure 7:
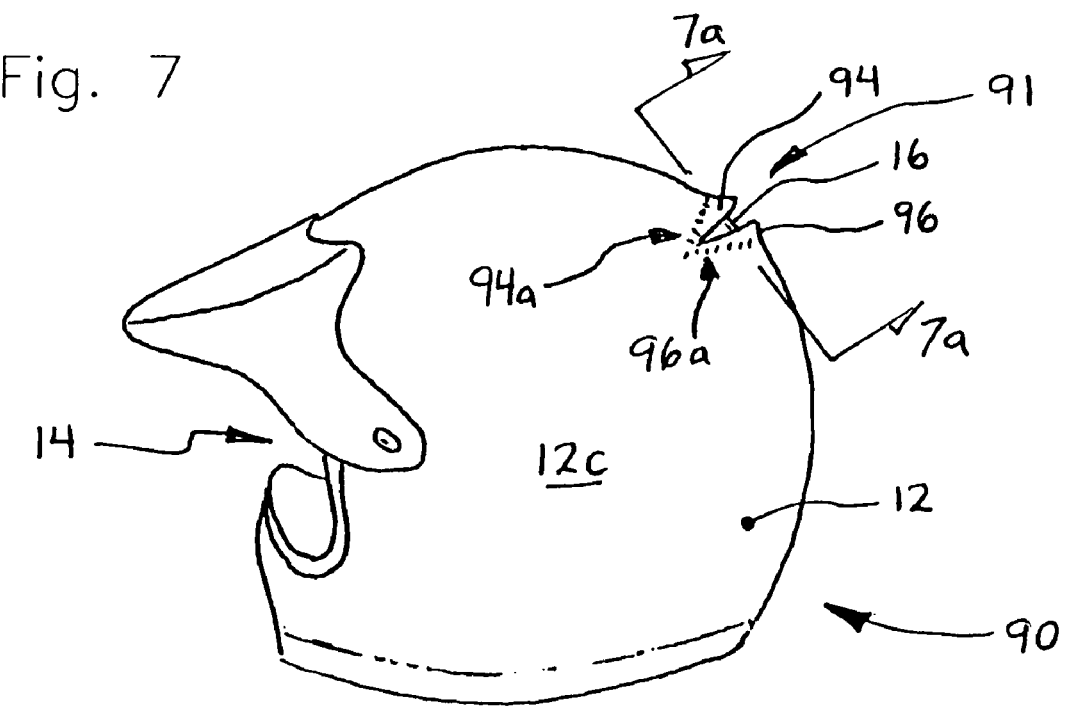
FIG. 7 is a rear perspective view of another embodiment of the safety helmet of this invention.

Another suitable mechanical shock detector is depicted in FIG. 7 of U.S. Pat. Nos. 4,068,613 and 4,125,085.

FIGS. 4A through 4D

In accordance with one feature of this invention, an attachment device 50 shown in FIGS. 4A through 4D is used to retrofit a conventional safety helmet converting the conventional safety helmet into the one embodiment of this invention, the helmet 10. This attachment device 50 includes a mounting member 52 that holds the shock detector 16. The mounting member 52 may be made of a rigid or a flexible material. For example, it may be molded from a plastic such as, for example, ABS (acrylonitrile-butadiene-styrene) resin. In this embodiment, it has an aerodynamic shaped having, for example, a triangular configuration and a maximum height that is less than ½ inch. The mounting member 52 is connected to the head enclosure 12 so that its tapered tip, the apex A, points in the forward-looking direction, that is the direction that the user looks through the face shield 22 when wearing the helmet 10. The mounting member 52 provides a tapered forward-looking element with beveled, inwardly sloped edges E1 around its perimeter. These edges E1 and its low profile is a safety feature. Due to this configuration, a tangential blow striking an edge E1 will not produce a major torque.

As best illustrated in FIG. 4C, the mounting member 52 includes a top wall 54 covering a recess 56 into which the shock detector 16 is lodged. The shock detector 16 rests on top of a bottom wall 58 and is at least partially covered by the top wall 54. The shock detector 16 may be secure to the top surface S1 (FIG. 4B) of the bottom wall 58 by an adhesive. The bottom wall 58 has an external underside surface portion 58a (FIG. 4D) coated with an adhesive 60 capable of holding the mounting member 52 securely on the exterior of the shell 12a of the helmet 10. The attachment device 50 has a removable sheet member 62 that covers the adhesive 60 that is removed when the attachment device 50 is to be connected to the shell 12a.

Another feature of the invention is a wall structure extending outward from an exterior surface of the helmet or the attachment device 50 that at least partially encloses the shock detector 16, at least partially covering it. Specifically, the mounting member 52 includes the top wall 54 that extends at least partially over the shock detector 16 and at least partially protects it against objects striking the detector and setting it off accidentally, or otherwise damaging it. A feature of the attachment device 50 is that removal of the mounting member 50 produces a visual indication of tampering. As illustrated in FIG. 4E, the attachment device 50 is partially pulled away from the external surface 12c of the helmet 10. If this occurs, either intentionally or unintentionally, a portion 65 of external surface 12c of the helmet 10 is damaged or a residue of adhesive 60 remains or the shock detector 16 "goes off," indicating tampering.

Another feature of the attachment device 50 is that the underside surface portion 58a of the bottom wall 58 has a predetermined shape that corresponds to the shape of an external surface 12c (FIG. 4) of the helmet 10. Thus, upon connection to the attachment device 50 to a conventional helmet, the external surface 12c of the bottom wall 58 bears against and abuts the external surface 12c of the helmet. Since most conventional helmets have an exterior surface that is a segment of a sphere, ovoid, or other bulbous geometrical figure, the external surface 12c of the bottom wall 58 is substantially concave and shaped to match substantially the curvature of the external surface 12c of the helmet 10. If the mounting member 52 is made of a flexible material, its underside surface portion 58a may be shaped to correspond to the predetermined shape of the external surface 12c of the helmet to which the attachment device is to be connected.

As an optional feature, on the topside of the bottom wall 58 is a "WARNING" imprinted on it. This "WARNING" may state ". . . that when a red color appears in the detector the helmet may no longer provide impact protection."

Figure 5:
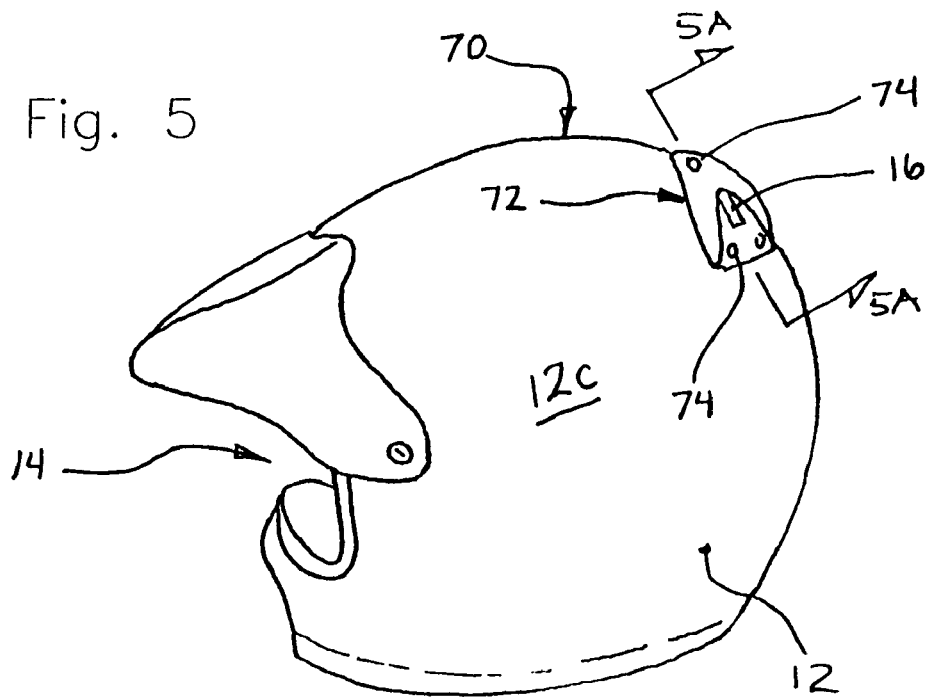
FIG. 5 is a rear perspective view of another embodiment of the safety helmet of this invention.
Figure 5A:
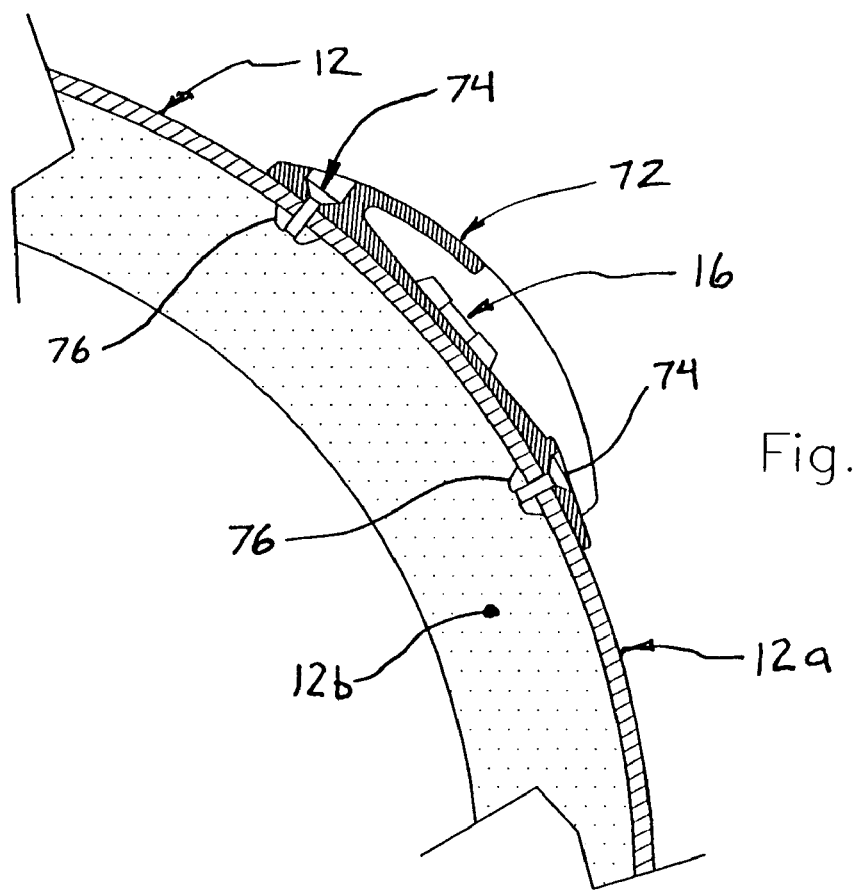
FIG. 5A is a cross-sectional view taken along line 5A-5A of FIG. 5.

FIGS. 5 and 5A

The embodiment of this invention depicted in FIGS. 5 and 5A, the helmet 70, is similar to the helmet 10, employing an attachment device 72 having a configuration substantially the same as that of the attachment device 50. The main difference is that the attachment device 72 does not use an adhesive covered by a cover member. Instead, the attachment device 72 is connected to the head enclosure 12 by fasteners 74 such rivets or screws having their respective ends connected into anchors 76 imbedded in the head enclosure.

Figure 6:
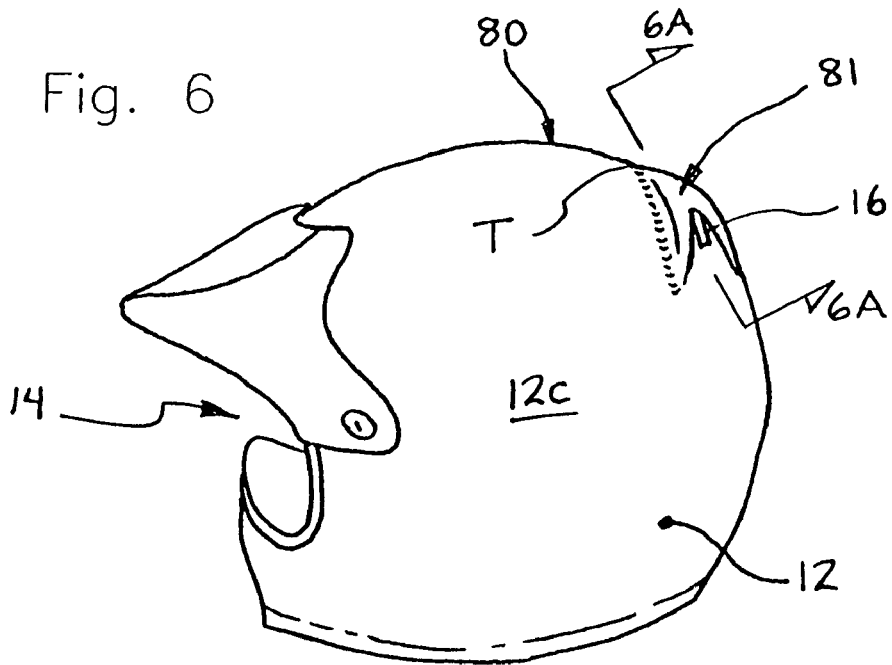
FIG. 6 is a rear perspective view of another embodiment of the safety helmet of this invention.
Figure 7A:
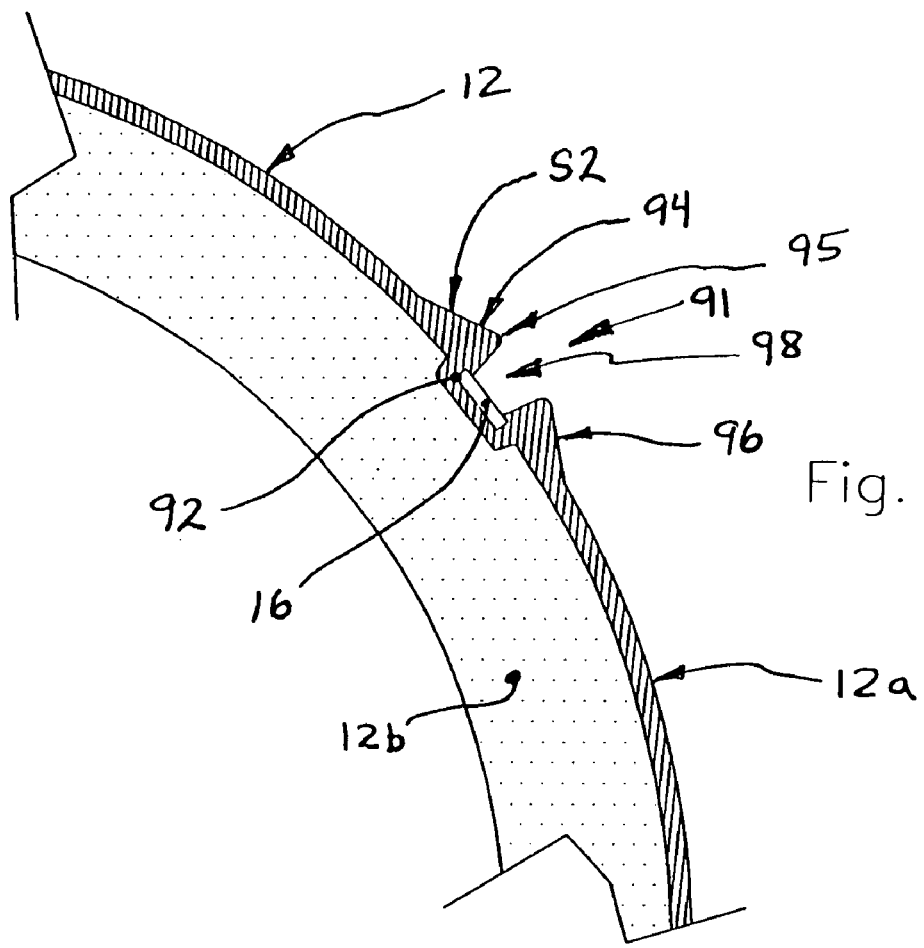
FIG. 7A is a cross-sectional view taken along line 7A-7A of FIG. 7.

FIGS. 6 through 7A

Figure 6A:
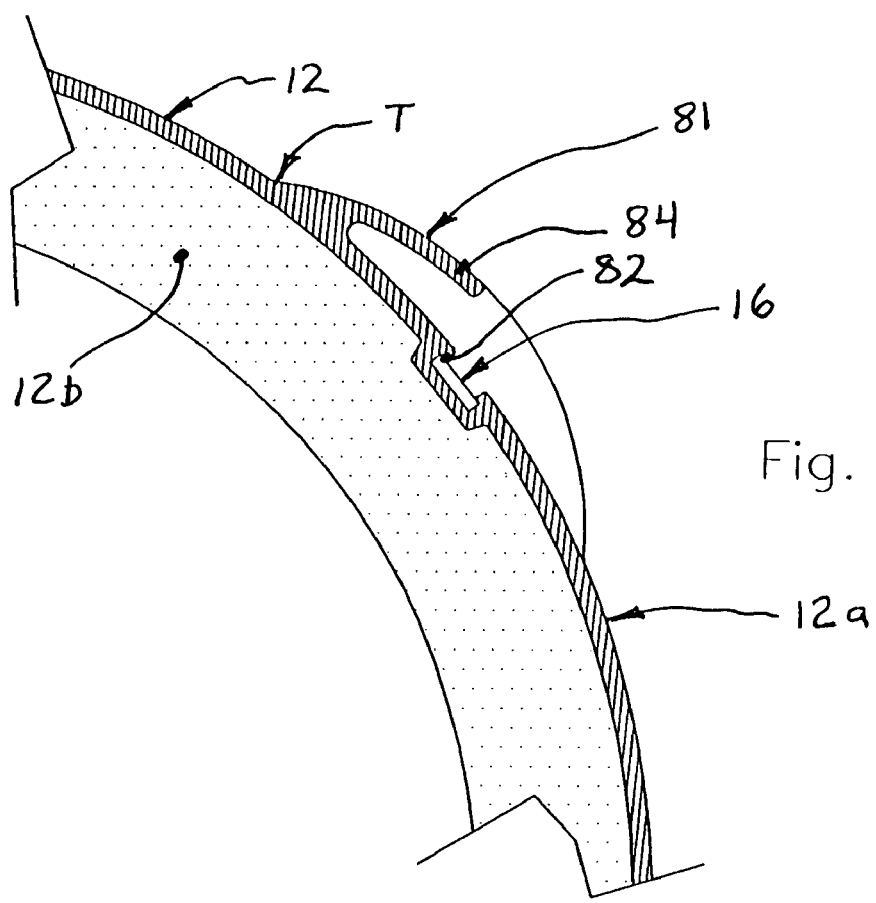
FIG. 6A is a cross-sectional view taken along line 6A-6A of FIG. 6.

The embodiment of this invention depicted in FIGS. 6 and 6A, the helmet 80, and the embodiment of this invention depicted 7 and 7A, the helmet 90, illustrate original equipment were the shock detector 16 is inserted into a protective wall structure created during the molding process used to manufacture the shell 12a. In the helmet 80 the exterior surface 12c has protective wall structure 81 including a recess 82 molded into the exterior surface 12c, with an integral spaced cover wall 84 overlying at least a portion of the shock detector 16 lodged in the recess. This protective wall structure 81 has an aerodynamic shape. In this example, it is shaped like an arrowhead, with the tapered tip T of the arrow pointing in the forward-looking direction. In the helmet 90 the exterior surface 12c has protective wall structure 91 including a recess 92 molded into the exterior surface 12c. This protective wall structure 91 is shaped like a pair of lips 94 and 96 parted slightly. These lips 94 and 96 extend outward from the shock detector 16, having a height sufficient to act as a barrier to prevent contact with objects that may damage the shock detector. The lips 94 and 96 are sufficient spaced apart to form a gap 98 (FIG. 7A) so any color change in the shock detector 16 may be observed by the user. The forward facing lip 94 has an aerodynamic shape, namely, its outer surface S2 (FIG. 7A) tapers gradually upward to a rounded edge 95. The outer ends 94a and 96a (only one pair shown in FIG. 7) of these lips 94 and 96 taper inward toward each other and gradually slope downward, merging at their extremities with the external surface 12c.

FIGS. 8 and 8A

FIGS. 8 and 8A depict another embodiment of the attachment device of the invention, namely, the attachment device 100. The attachment device 100 includes a mounting member 102, typically made of plastic, having an exterior side 102a that is exposed to view upon attaching the mounting member to a helmet 104. The shock detector employed in this embodiment is an electronic accelerometer 106 of the type discussed above and it includes a light source 108 that is energized electrically to provide a visual signal upon detecting an impact exceeding a predetermined g level. The mounting member 102 includes an internal recess 112 (FIG. 8) sized to hold snugly the electronic accelerometer 106. This electronic accelerometer 106 may simply be imbedded within the mounting member 102 during molding.

The electronic accelerometer 106 and the light source 108, for example, a light emitting diode (LED), are substantially entirely enclosed within the mounting member 102. A window 110 opposite the light source 108 enables the visual signal to be observed. The window may be open or closed-comprising a transparent or translucent section of the molded plastic mounting member 102. A side 102b with an adhesive thereon enables the attachment device 100 to be secured to an exterior surface of the helmet. This side 102b may be shaped to conform to the shaped of the exterior surface of the helmet 104 as discussed above.

The electronic accelerometer 106 has a conductive cord 114 extending outward through a passageway 115 in the mounting member 102. The conductive cord 114 has an external terminal end 116 that is detachably connected to a control circuit 120 including a microprocessor (not shown) and power source 118 for the electronic accelerometer 106. The control circuit 120 and power source 118 are attached to a garment 122 (only a portion shown) worn by the person wearing the helmet 104. When the helmet 104 is to be removed from this person's head, the terminal end 116 of the conductive cord 114 is detached manually from the power source 118 and control circuit 120. The power source and control circuit 120 may also be mounted to the helmet 104 directly. Moreover, the entire electronic shock detector with all its components may be incorporated into the helmet directly in a manner similar to that discussed above in connection with the mechanical shocker detector used in the embodiments shown in FIGS. 6 and 7.

The mounting member 102 also provides a tapered forward-looking element with beveled, inwardly sloped edges E2 around its perimeter to provide a safety feature as discussed above.

FIGS. 9 through 10A

The attachment device of this invention may have different shapes and sizes and employ shock detectors calibrated differently as discussed subsequently in greater detail. For example, the attachment device 200 shown in FIGS. 9 and 9A is used with helmets employed in motor sports, and the attachment device 300 shown in FIGS. 10 and 10A is used with helmets employed in winter sports such as skiing and snow boarding. The attachment device 200 includes a mechanical shock detector 202 located near the apex 204a of its mounting member 204, which includes a protective overhanging wall 205 covering the shock detector 202 with a window 207 allowing the user to see any change of color in the detector. The attachment device 300 includes a mechanical shock detector 302 located near the base 304a of its mounting member 304, which includes a protective overhanging wall 305 covering the shock detector 302 with a window 307 allowing the user to see any change of color in the detector. The shock detectors 202 and 302 are activated at different g force levels.

Both mounting members 204 and 304 each have a side A that is exposed to view upon attaching a member to a helmet to enable a visual signal from the shock detectors 202 or 302, as the case may be, to be observed. Each also include a second side B with an opening 99 providing access to recesses 206 and 306, respectively, in the mounting members 204 and 304. The openings 99 enable the shock detector 202 or the shock detector 302, as the case may be, to be inserted into their respective recesses from the second side B. A wall element, for example a solid gasket with adhesive on its opposed exterior and interior sides, is attached to the second side B to cover the openings 99. The sides A and B are opposite each other, and the second side B is shaped so that this second side conforms in shaped to the exterior surface of the helmet to which it is attached.

The mounting members and 204 304 are each tapered forward-looking elements with beveled, inwardly sloped edges E3 and E4, around their respective perimeters to provide a safety feature as discussed above.

Calibration

The different embodiments of this invention may each have a shock detector that is activated by impacts with different g forces corresponding to the use of (a) a particular type of helmet design (b) different helmet damage criteria, or (c) different head injury criteria. Depending on the shape, weight, dimensions and other parameters of the helmet or the attachment device and their intended use, the shock detector is calibrated to respond and provide a signal for impact levels commensurate with use. Nominally, the shock detector is calibrated to provide the signal when subjected to an acceleration of from about 50 to about 200 g's for 50 milliseconds or an acceleration of from about 150 to about 500 g's for 2 milliseconds. But for each individual design of the attachment device and the type of helmet it is to be used with, an empirical test is conducted. An empty helmet with the shock detector, or a simulated head-form mass and shape positioned with a helmet with detector, is drop from a predetermined elevation above ground, and upon striking the ground, the shock detector is activated by the impact to provide the signal, but does not provide this signal when dropped to ground at a lower elevation. Different helmet designs and uses require different and appropriate selection of test elevations.

Method of Identifying a Damaged Helmet

Figure 11:
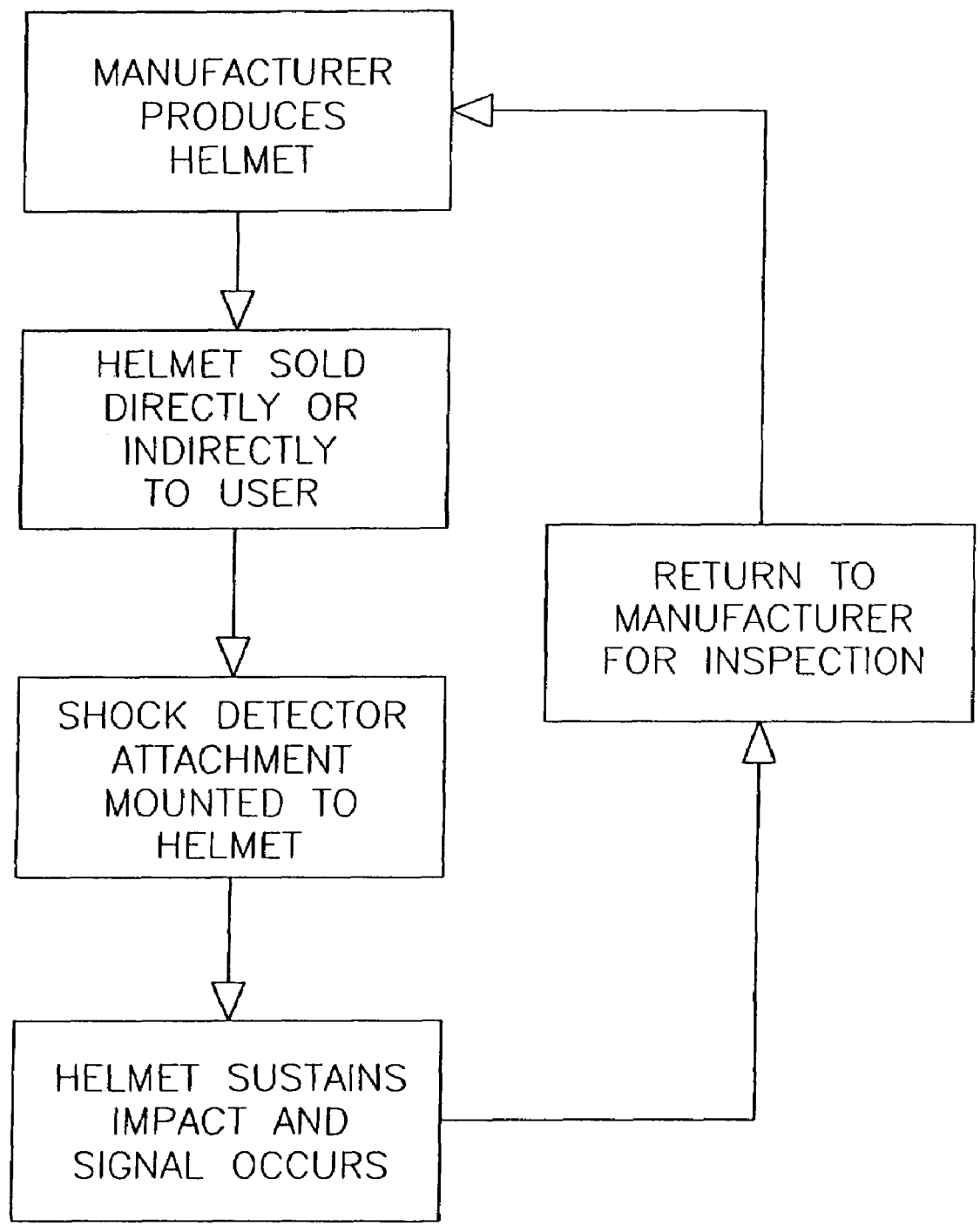
FIG. 11 is a schematic diagram depicting one method of this invention.

As depicted in FIG. 11, this invention also includes a method of identifying a damaged helmet. In accordance with this method, one of the embodiments of the attachment device is attached to a helmet or the shock detector is included as a component of the helmet made by a helmet manufacturer. In the case where the helmet is sold without a shock detector, the user usually attaches the attachment device including the shock detector after purchasing the helmet either directly from the manufacturer or indirectly through a retail outlet. As discussed above, the shock detector provides a signal when the helmet has been subjected to an impact exceeding a predetermined g level. When this signal occurs, the helmet is returned to its manufacturer for inspection to determine if it is damaged and needs to be replaced. The inspection typically employs non-destructive testing methods, for example, as simple as tapping its exterior surface to detect a sound that indicates that the liner of the helmet has been damaged. Sound testing of the helmet may include the use of ultrasonic techniques.

Method of Monitoring for a Possible Head Injury

This invention also includes a method of monitoring for a possible head injury to an athlete participating in a sporting activity or a soldier in combat. Head blows sustained by an athlete, or a nearby bomb blast or other shock experienced by a soldier, who is wearing a helmet may nevertheless be injured, notwithstanding the protection afforded by the helmet. In accordance with the method of this invention, the athlete or soldier wears a helmet equipped with a shock detector as discussed above during the sporting activity or combat, as the case may be. Consequently, a signal is provided when the helmet is subjected to an impact exceeding a predetermined level during the sporting activity or combat. This signal not only serves to give notice that the helmet may have been damaged, it also serves as a warning that the athlete or soldier may have been injured even if the athlete or soldier does not experience an immediate painful or other physically harmful or symptomatic condition such a fainting, dizziness, blurry vision, vomiting, etc. During sporting activity, when the signal occurs, the athlete's participation in the sporting activity is terminated for a period of time to observe the athlete's physical condition, even if the athlete experiences no adverse effects from the blow to the helmet he or she is wearing. This may be of a few minutes or for the remainder of the sporting activity. Typically, a coach or trainer will make the decision to allow the athlete to resume participation in the sporting activity after the signal occurs.

FIGS. 12 through 15

Combat Use of Military Helmet With Shock Detector

The nature of warfare encountered in recent conflicts has resulted in a dramatic rise in the number of traumatic brain injuries. This appears to be due to several factors including the prevalence of improvised explosive devices (IEDs) and other blast-type injuries, higher survival rates due to improvements in body armor, and a significant number of vehicle-related impact injuries. A pressure wave resulting from a blast can result in brain injuries ranging from minor to life-threatening through a number of mechanisms. One such mechanism is the violent acceleration induced when the victim's head and helmet interact with the blast wave. This interaction typically has the characteristics of a high-frequency, high peak-g blunt impact, such as might occur from a collision with a hard massive object.

Combat helmets currently in the field provide minimum protection against blunt impact and blast wave accelerations. They are designed principally to protect against ballistic threats such as fragmentation munitions and handgun projectiles. Long-term effects of traumatic brain injuries can be physical, emotional, and cognitive and are difficult to overcome if left untreated. Traumatic brain injuries are difficult to diagnose and differentiate from other injuries. They are inherently invisible and as such can be overlooked during casualty assessment in favor of treating injuries that may be more obvious or immediately threatening to life. An individual who sustains a traumatic brain injury as his or her only injury is even more likely to be overlooked. A first short-term concern is the risk of second impact syndrome. Regardless of the severity of the initial traumatic brain injury, a second brain injury during the critical hours, days, or weeks of recovery can be life threatening. Thus identification of the first injury is essential. A second short-term concern is that memory and attention difficulties following a traumatic brain injury often lead to diminished survival skills on the battlefield.

Figure 12:
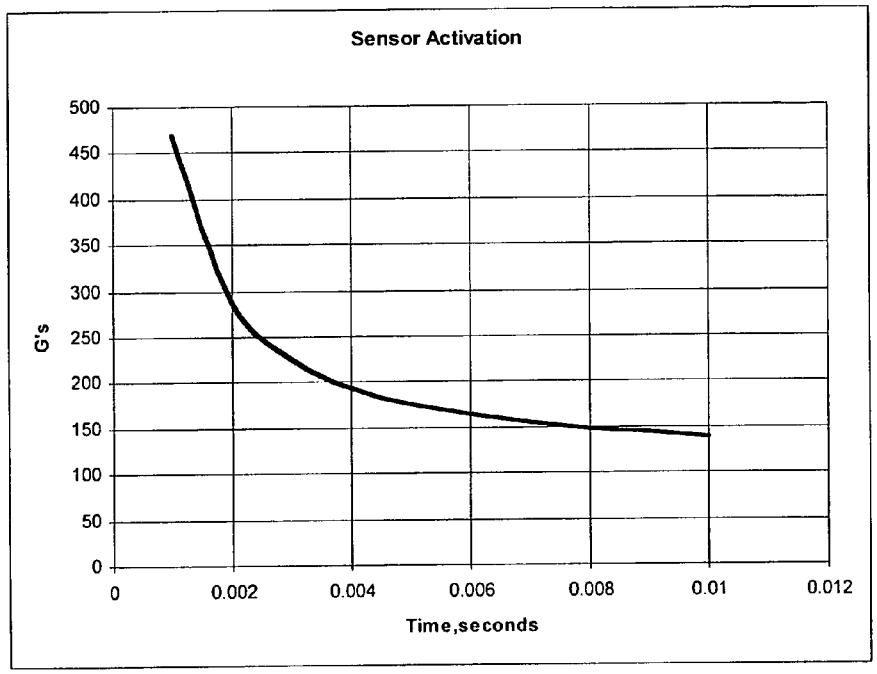
FIG. 12 is a graph depicting the Wayne State Tolerance Curve.

Most models of head injury take into account an acceleration and time dependent relationship. That is to say: whether a given amount of acceleration measured in the brain is dangerous or life threatening depends on the amount of time that the brain is subjected to the acceleration. Examples of injury standards that utilize this are Federal Motor Vehicle Safety Standard (FMVSS) No. 218 for Motorcycle Helmets and FMVSS 208 for automobile crashes. This concept is based ultimately on research conducted at Wayne State University (Patrick, Lissner, and Gurdjian, 1963). A curve representing this phenomenon, known as the Wayne State Tolerance Curve, is shown in FIG. 12.

The liquid surface tension technology employed in the mechanical version of the shock detector 16 of the type sold by Detectors, Inc., of Graham, Tex. under the trademark Shockwatch® is especially suitable for military applications. Such a shock detector 16 is suited to discerning dangerous vs. non-dangerous head accelerations because the nature of its operation produces a similar curve (see FIG. 13) as illustrated in FIG. 12. In other words, a given shock detector size will not activate at a high g-level if the time duration of the shock is short. But it will activate at a lower g-level and a higher time duration.

Figure 13:
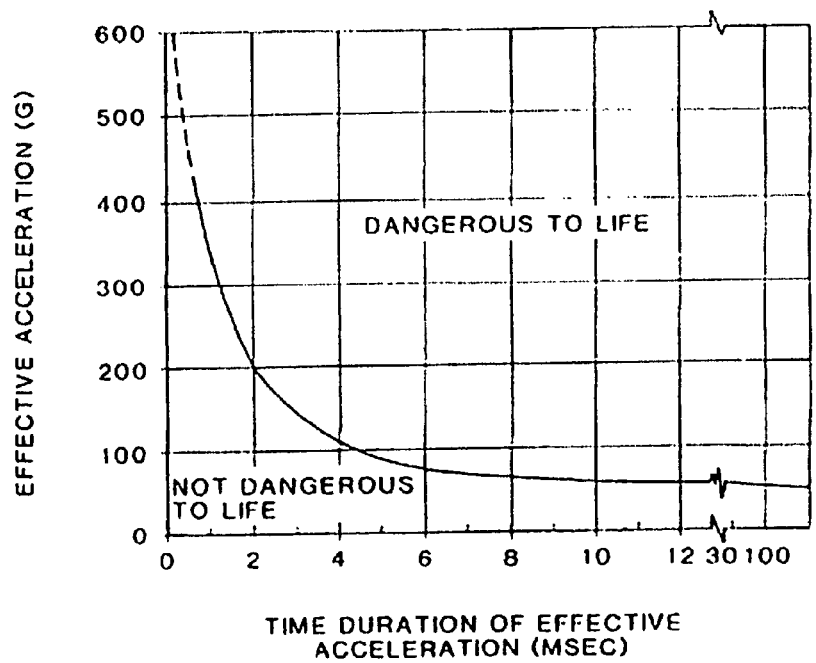
FIG. 13 is a graph illustrating that one of the shock detector employed in this invention produces a curve similar to the Wayne State Tolerance Curve.

As depicted in FIGS. 14 and 15, a military helmet H in accordance with this invention has the attachment device 50 shown in FIGS. 4A through 4D mounted on the exterior surface EXT of the helmet's rear side along a centerline CL of the helmet. The helmet H provides enclosure with an open cavity OC for the head of military personal wearing the helmet. The shock detector 16 employing liquid surface tension technology is utilized as previously discussed to give a clear and immediate visual indication to unit commanders and field medical personnel when a high-risk head acceleration has occurred. The shock detector 16 is mounted on the rear of the helmet H, where shock levels are typically higher than they are in the brain. So a comparison of the exact numbers between the two curves shown in FIGS. 12 and 13 is unimportant, only the general shape of the curve is. This characteristic makes the application of mechanical shock detector 16 perfect for head injury risk exposure. Thus use of the helmet H with the shock detector 16 provides vital information to medical staff, or others seeking to detect traumatic brain injuries sustained by military personnel.

As identified by military medical experts, brain injury screening is a principal need in order to mitigate both the long and short-term effects of traumatic brain injuries. The helmet H using the attachment device 50 including the shock detector 16 provides early detection of traumatic brain injuries. Mechanical or electronic shock detectors may be used. The advantage of the mechanical shock detectors is that they are easy to retrofit. The advantage of the electronic shock detectors is that they enable the impact information to be stored or transmitted. When military personnel wearing the helmet H experience a head shock above a predetermined g level for a sustained period, the shock detector 16 generates a signal, providing information critical to removing a potentially brain-injured soldier from combat duty. This greatly reduces injured soldier's exposure to a second traumatic brain injury and to the consequences of operating in the battlefield with memory and attention difficulties. Thus use of the helmet shock detectors in a combat setting provides vital information about the impact experience by a particular individual. In accordance with the method of this invention, this impact information is recorded in the medical record of the particular individual. Consequently, initial and subsequent caregivers will be able to evaluate correctly the medical condition of the individual. This helps commanders, as well as military medical staff, to reduce both the long and short-term effects of traumatic brain injuries described above. The medical record may assist in establishing claims to veteran benefits.

SCOPE OF THE INVENTION

The above presents a description of the best mode contemplated of carrying out the present invention, and of the manner and process of making and using it, in such full, clear, concise, and exact terms as to enable any person skilled in the art to which it pertains to make and use this invention. This invention is, however, susceptible to modifications and alternate constructions from that discussed above which are fully equivalent. Consequently, it is not the intention to limit this invention to the particular embodiments disclosed. On the contrary, the intention is to cover all modifications and alternate constructions coming within the spirit and scope of the invention as generally expressed by the following claims, which particularly point out and distinctly claim the subject matter of the invention.

The invention claimed is:

1. A helmet including
a head enclosure with an open cavity for the head of a user, said head enclosure comprising a tough, substantially rigid yet flexible shell and an internal impact absorbing liner suited to absorb an impact exceeding a predetermined level, and
a shock detector attached to an exterior surface of the head enclosure that provides a visual signal when the head enclosure is subjected to said impact, said shock detector being an accelerometer employing liquid surface tension technology to detect said impact, where the liner comprises a foam material that is compressed to absorb said impact, where the shock detector is retained within a mounting member having an external portion including an adhesive, said external portion bearing against the exterior surface of the head enclosure and the adhesive holding the mounting member to said head enclosure and where removal of the mounting member produces a visual indication of tampering.

2. An attachment device for a helmet comprising
a mounting member holding a shock detector that, upon attaching said member to the helmet, provides a provides a visual signal when the helmet is subjected to an impact exceeding a predetermined level,
said mounting member having a recess including a surface to which the shock detector is attached and an external portion including an adhesive capable of holding the mounting member on the helmet, and a removable member that covers said adhesive and where the mounting member has an aerodynamic shape including a tapered forward-looking element with beveled, inwardly sloped edges and a low profile that is less than ½ inch.

3. The attachment device of claim 2 where the mounting member includes a wall structure forming at least in part said recess, said wall structure partially enclosing the shock detector.

4. The attachment device of claim 2 including a warning that when the visual signal appears the helmet may no longer provide impact protection.

5. A helmet including
a head enclosure having an internal open cavity for the head of a user and an exterior surface with a centerline and a rear side,
a mounting member attached to the rear side of the exterior surface of the enclosure along the centerline,
said mounting member having a low profile that is less than ½ inch and a recess formed between top and bottom walls, and
a shock detector employing liquid surface tension technology to detect an impact to the helmet and provide a visual signal upon the impact exceeding a predetermined level, said shock detector being within a recess and having at least a portion thereof partially exposed so, when the helmet is subjected to the impact, the visual signal can be seen by an observer while the user is still wearing the helmet.

6. The helmet including of claim 5 the mounting member has
a tapered forward-looking element with beveled, inwardly sloped edges and the recess is within said forward-looking element, and
an external portion including an adhesive that binds said mounting member to said exterior surface of the helmet.

7. The helmet including of claim 5 where removal of the mounting member produces a visual indication of tampering.

8. A helmet including
a head enclosure having an internal open cavity for the head of a user and an exterior surface,
a shock detector employing liquid surface tension technology that provides a visual signal when the head enclosure is subjected an impact exceeding a predetermined level, said shock detector not responding to a high g-level impact of short time duration but being activated by a lower g-level impact of a higher time duration, and
a mounting member for the shock detector on the exterior surface of the enclosure, said mounting member having a recess with a protective wall structure enclosing the shock detector with at least a portion of the detector partially exposed so, when the helmet is subjected to the impact, the visual signal can be seen by an observer while the user is still wearing the helmet.

9. The helmet of claim 8 where the mounting member has a low profile that is less than ½ inch and an external portion including an adhesive that binds said mounting member to said exterior surface of the helmet.

10. The helmet of claim 8 where the shock detector discerns dangerous vs. non-dangerous head accelerations consistent with the Wayne State Tolerance Curve.

11. An attachment device for a helmet comprising
a mounting member separate from the helmet and adapted to be attached to an exterior surface of the helmet,
said mounting member including an accelerometer type shock detector employing liquid surface tension technology that provides a visual signal when the helmet is subjected to an impact exceeding a predetermined level, said shock detector not responding to a high g-level impact of short time duration but being activated by a lower g-level impact of a higher time duration,
a recess that holds the shock detector between a pair of walls with at least a portion of the detector partially exposed so, when the helmet is subjected to the impact, the visual signal can be seen by an observer while the user is still wearing the helmet,
said mounting member having an external portion including an adhesive capable of holding the mounting member on the helmet, and
a removable member that covers said adhesive.

12. The attachment device of claim 11 where the mounting member has a forward tapered element with beveled, inwardly sloped edges and a low profile that is less than ½ inch.

13. The attachment device of claim 11 including a warning that when the visual signal appears the helmet may no longer provide impact protection.

14. The attachment device of claim 11 where the mounting member is made of a flexible material and the external portion has a surface that is shaped to correspond to a shape of the exterior surface of the helmet to which the attachment device is to be connected, so that upon connection to the helmet the surface the external portion bears against the external surface of the helmet.

15. The attachment device of claim 14 where said predetermined shape is substantially concave.

16. The attachment device of claim 11 where said shock detector does not respond to a high g-level impact of short time duration but is activated by a lower g-level impact of a higher time duration.

17. The attachment device of claim 11 where the shock detector discerns dangerous vs. non-dangerous head accelerations consistent with the Wayne State Tolerance Curve.

18. The attachment device of claim 17 where the shock detector is calibrated to provide said signal when subjected to an acceleration substantially from 50 to 200 g's for 50 milliseconds or an acceleration substantially from 150 to 500 g's for 2 milliseconds.

* * * * *